United States Patent
Hihara et al.

(10) Patent No.: US 9,352,787 B2
(45) Date of Patent: May 31, 2016

(54) RESIN FLOOR STRUCTURE OF VEHICLE

(75) Inventors: Yasuyuki Hihara, Toyota (JP); Koki Ikeda, Toyota (JP); Sho Maeda, Toyota (JP); Yoshitaka Sotoyama, Nisshin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/355,958

(22) PCT Filed: Nov. 7, 2011

(86) PCT No.: PCT/JP2011/075630
§ 371 (c)(1),
(2), (4) Date: May 2, 2014

(87) PCT Pub. No.: WO2013/069086
PCT Pub. Date: May 16, 2013

(65) Prior Publication Data
US 2014/0300141 A1    Oct. 9, 2014

(51) Int. Cl.
*B62D 25/20*    (2006.01)
*B62D 29/04*    (2006.01)

(52) U.S. Cl.
CPC .............. *B62D 25/20* (2013.01); *B62D 29/041* (2013.01)

(58) Field of Classification Search
CPC ............................... B62D 21/152; B62D 25/08
USPC .................... 296/187.09, 203.02, 204, 193.07
See application file for complete search history.

(56) References Cited

U.S. PATENT DOCUMENTS

| | | | | |
|---|---|---|---|---|
| 3,321,235 A | * | 5/1967 | Muller et al. | 296/204 |
| 4,129,330 A | * | 12/1978 | Schwuchow | 296/204 |
| 4,892,350 A | * | 1/1990 | Kijima | 296/204 |
| 5,020,846 A | | 6/1991 | Bonnett | |
| 5,127,704 A | * | 7/1992 | Komatsu | 296/204 |
| 6,209,948 B1 | | 4/2001 | Mori et al. | |
| 6,938,948 B1 | * | 9/2005 | Cornell et al. | 296/187.09 |
| 7,097,238 B2 | * | 8/2006 | Fujita | 296/193.07 |
| 7,832,795 B2 | * | 11/2010 | Yokoi et al. | 296/204 |
| 2011/0133518 A1 | | 6/2011 | Wanke et al. | |

FOREIGN PATENT DOCUMENTS

| | | |
|---|---|---|
| CN | 102107682 A | 6/2011 |
| EP | 1464567 A1 | 10/2004 |
| EP | 2390166 A1 | 11/2011 |

(Continued)

OTHER PUBLICATIONS

Extended European Search Report issued Dec. 15, 2015, in European Application No. 11875348.2-1755.

*Primary Examiner* — Glenn Dayoan
*Assistant Examiner* — Sunsurraye Westbrook
(74) *Attorney, Agent, or Firm* — Kenyon & Kenyon LLP

(57) ABSTRACT

Rocker portions and a tunnel portion that serve as frame portions extend along a vehicle longitudinal direction respectively at vehicle transverse direction both end portions of an upper floor and a vehicle transverse direction central portion of an upper floor. On the other hand, a dash panel or a back panel is provided erect respectively at a front end portion of a lower floor (22) and a rear end portion of a lower floor. Here, abutment portions are provided at front end portions of the rocker portions and the tunnel portion respectively, and planarly contact an inner surface of the dash panel. Further, abutment portions are provided at rear end portions of the rocker portions and the tunnel portion respectively, and planarly contact an inner surface of the back panel.

3 Claims, 4 Drawing Sheets

(56) References Cited

FOREIGN PATENT DOCUMENTS

| JP | 61-190776 U | 11/1986 |
| JP | 03-084286 A | 4/1991 |
| JP | H4-23585 U | 2/1992 |
| JP | 3200853 B2 | 8/2001 |
| JP | 2008-155700 A | 7/2008 |

* cited by examiner

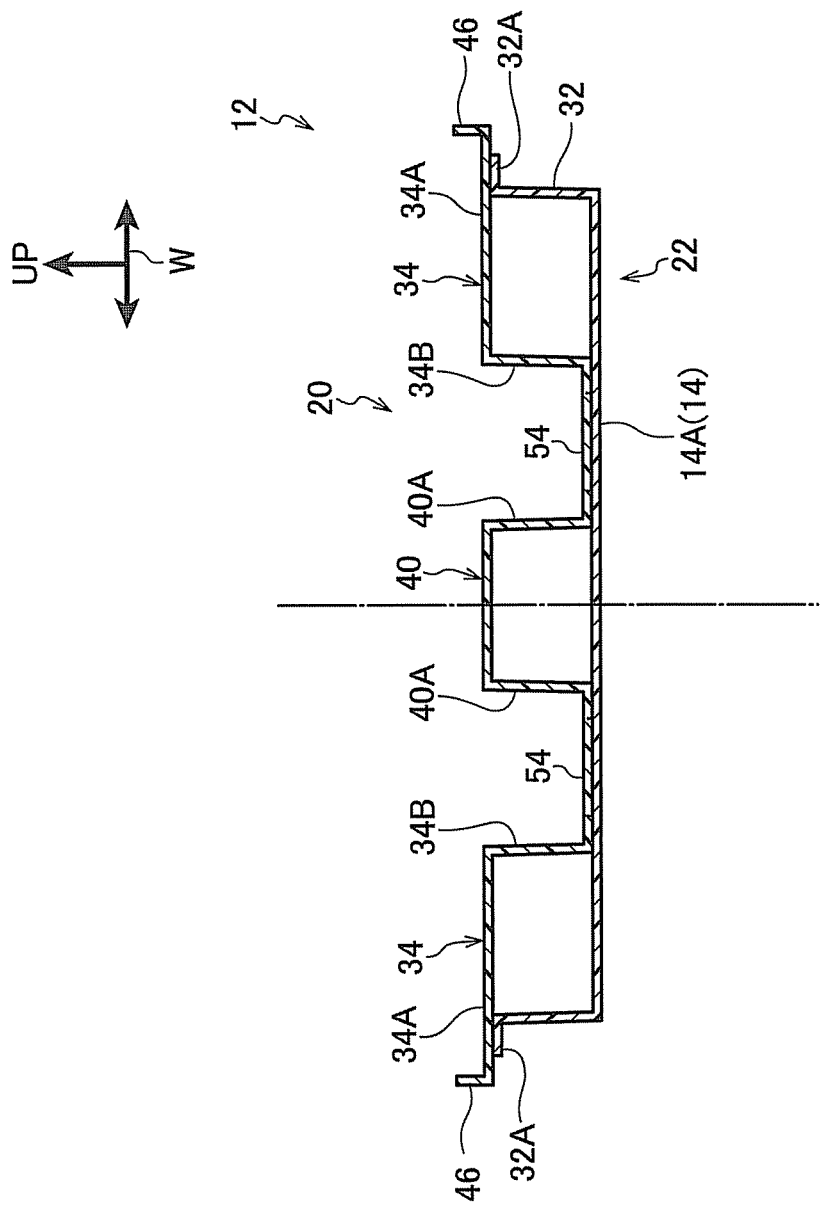

RESIN FLOOR STRUCTURE OF VEHICLE

CROSS-REFERENCE TO RELATED APPLICATIONS

This is a national phase application based on the PCT International Patent Application No. PCT/JP2011/075630 filed Nov. 7, 2011, the entire contents of which are incorporated herein by reference.

TECHNICAL FIELD

The present invention relates to a resin floor structure of a vehicle that is structured by a floor portion made of resin.

BACKGROUND ART

For example, the technique disclosed in Japanese Patent Application Laid-Open (JP-A) No. H03-84286 is an example of a floor structure that is made of metal and that, although ensuring strength and rigidity of the floor portion of a vehicle, is easy to mold. To describe this structure briefly, the floor portion is formed by being divided into a floor plate that has a flat shape and a tunnel member whose cross-sectional shape is formed in a substantially U-shape, and the tunnel member is fixed to the top surface of the floor plate. At this time, the front end portion of the tunnel member is joined to a front wall (dash panel) that is provided erect at the front end portion of the floor plate, and the rear end portion of the tunnel member is joined to a rear wall (back panel) that is provided erect at the rear end portion of the floor plate. On the other hand, in recent years, techniques of forming a floor portion of fiber-reinforced plastic have been proposed (e.g., JP-A No. 2008-155700).

DISCLOSURE OF INVENTION

Technical Problem

An object of the present invention is to obtain a resin floor structure of a vehicle at which the strength and rigidity in a vehicle longitudinal direction can be improved.

Solution to Problem

A first aspect of the present invention provides a resin floor structure of a vehicle, comprising: a lower floor made of resin and structuring a lower portion of a floor portion; an upper floor made of resin and superposed on the lower floor, the upper floor structuring an upper portion of the floor portion, and frame portions extending along a vehicle longitudinal direction respectively at vehicle transverse direction both end portions of the upper floor and vehicle transverse direction central portion of the upper floor; and vertical walls provided at both end portions of the lower floor in the vehicle longitudinal direction, the vertical walls being provided erect toward a vehicle upper side, front end portions or rear end portions of the frame portions in the vehicle longitudinal direction, or front and rear end portions of the frame portions in the vehicle longitudinal direction respectively abutting the vertical walls.

In the above-described aspect, the floor portion is structured in a state in which the upper floor that is made of resin is superposed on the lower floor that is made of resin. The frame portions extend along the vehicle longitudinal direction respectively at the vehicle transverse direction both end portions of the upper floor and the vehicle transverse direction central portion of the upper floor. Due thereto, the strength and the rigidity of the floor portion improve.

Further, the vertical walls are provided erect toward the vehicle upper side at both end portions of the lower floor in the vehicle longitudinal direction. The front end portions or the rear end portions of the frame portions in the vehicle longitudinal direction, or the front and rear end portions of the frame portions in the vehicle longitudinal direction, which are provided at the upper floor, respectively abut the vertical walls. Therefore, at the vehicle, when impact load is inputted along the vehicle longitudinal direction, this impact load is transmitted to the vertical walls of the lower floor. Because the end portions of the frame portions of the upper floor respectively abut the vertical walls, the impact load that is transmitted to a vertical wall of the lower floor is transmitted to the frame portions of the upper floor via that vertical wall. Namely, the impact load can be received at the entire floor portion.

In a second aspect of the present invention, in the first aspect of the present invention, abutment portions that planarly contact the vertical walls are provided respectively at the front end portions or the rear end portions of the frame portions in the vehicle longitudinal direction, or at the front and rear end portions of the frame portions in the vehicle longitudinal direction.

In the above-described structure, abutment portions are provided respectively at the front end portions or the rear end portions of the frame portions in the vehicle longitudinal direction, or at the front and rear end portions of the frame portions in the vehicle longitudinal direction, and are formed so as to planarly contact the vertical walls that are formed at the lower floor. In this way, by providing the abutment portions, that planarly contact the vertical walls, respectively at the front end portions or the rear end portions of the frame portions in the vehicle longitudinal direction, or at the front and rear end portions of the frame portions in the vehicle longitudinal direction, these frame portions are joined (adhered) to the vertical walls via an adhesive for example. In this case, as compared with a case in which the front end surfaces or the rear end surfaces of the frame portions, or the front and rear end faces of the frame portions are joined to the vertical walls, the surface area of joining with the vertical walls can be increased by an amount corresponding to the surface area over which the abutment portions are formed. Therefore, the joining strength can be improved.

In a third aspect of the present invention, in the first or second aspect of the present invention, the frame portions may be made to be rocker portions provided so as to project at the vehicle transverse direction both end portions of the upper floor respectively, and a tunnel portion provided so as to project at the vehicle transverse direction central portion of the upper floor, and closed cross-sections may be structured respectively between the lower floor, and the rocker portions and the tunnel portion.

In the above-described structure, as the frame portions, the rocker portions are provided to project at the vehicle transverse direction both end portions of the upper floor respectively, and the tunnel portion is provided to project at the vehicle transverse direction central portion of the upper floor. Due thereto, the strength and rigidity of the upper floor itself improves. Further, the strength and rigidity of the floor portion can be improved due to these rocker portions and tunnel portion respectively structuring closed cross-sections between the lower floor, and the rocker portions and the tunnel portion.

In a fourth aspect of the present invention, in the third aspect of the present invention, connecting portions that connect the rocker portions and the tunnel portion may be provided at the upper floor.

In the above-described structure, by providing the connecting portions, that connect the rocker portions and the tunnel portion, at the upper floor, the rocker portions and the tunnel portion can be made integral via these connecting portions.

Advantageous Effects of Invention

As described above, the first aspect of the present invention has the excellent effect that the strength and rigidity in the vehicle longitudinal direction can be improved in a resin floor structure of a vehicle.

The second aspect of the present invention has the excellent effect that impact load can be reliably transmitted from a vertical wall to frame portions.

The third aspect of the present invention has the excellent effect that, by a simple structure, the strength and rigidity in the vehicle longitudinal direction can be improved at a floor portion.

The fourth aspect of the present invention has the excellent effects that an upper floor, at which rocker portions and a tunnel portion are provided, can be formed by integral molding, and the number of parts can be reduced.

BRIEF DESCRIPTION OF DRAWINGS

FIG. 4 is a cross-sectional view that is cut along line 4-4 of FIG. 1.

BEST MODES FOR CARRYING OUT THE INVENTION

Figure 1:
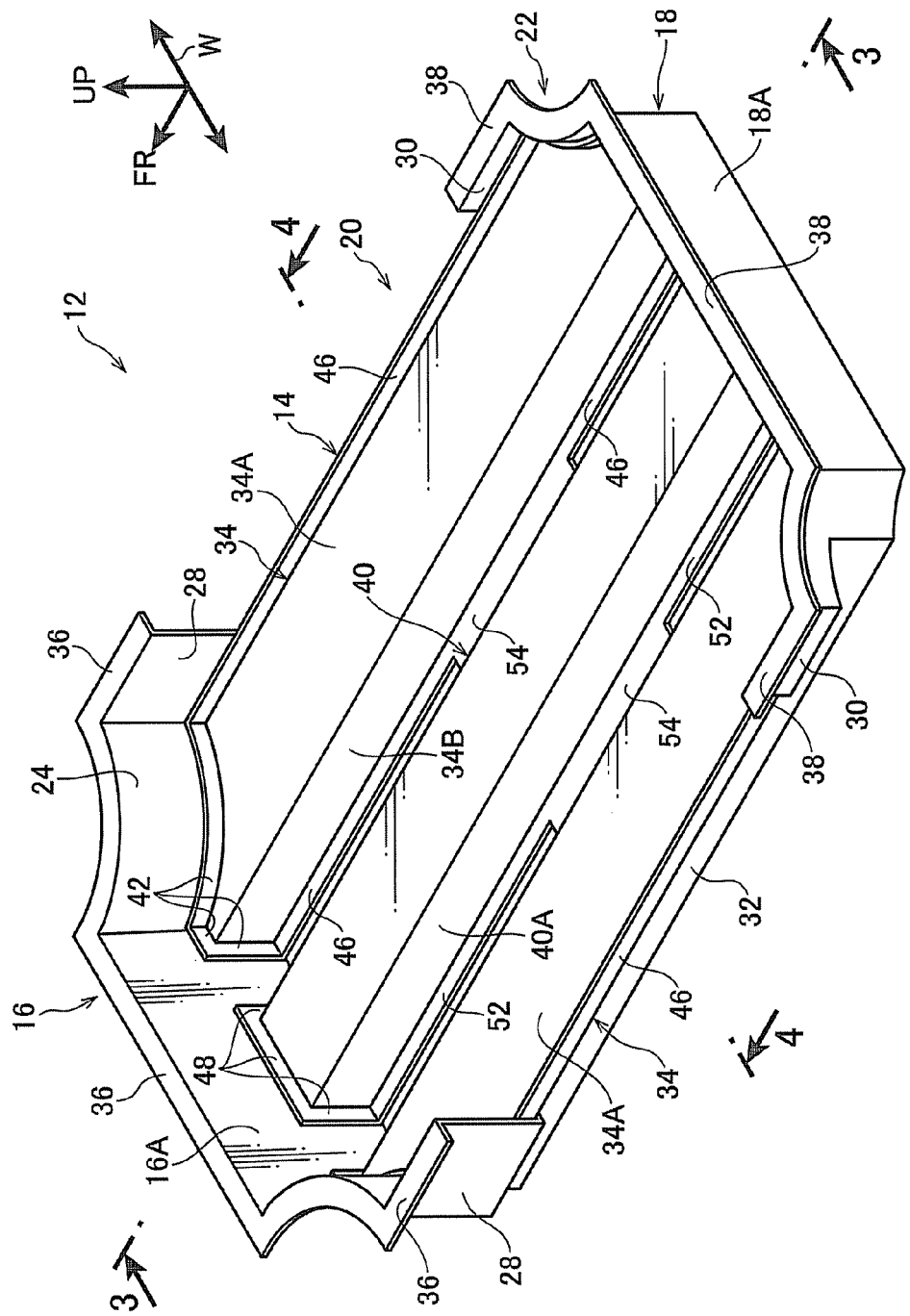
FIG. 1 is a perspective view showing a resin floor structure of a vehicle relating to the present embodiment.

A resin floor structure of a vehicle relating to an embodiment of the present invention is described on the basis of FIG. 1 through FIG. 4. Note that arrow FR that is shown appropriately in the drawings indicates the frontward direction in the vehicle longitudinal direction, arrow UP indicates the upward direction in the vehicle vertical direction, and arrow W indicates the vehicle transverse direction, respectively.

Structure of Resin Floor Structure of Vehicle

A perspective view of a resin floor 12, to which the resin floor structure of a vehicle relating to the present embodiment is applied, is shown in FIG. 1. The resin floor 12 has a floor portion 14 that is plate-shaped and is formed in a substantially rectangular shape as seen in plan view, a dash portion 16 that is provided erect so as to be directed upwardly from the front end portion of the floor portion 14, and a back portion 18 that is provided erect so as to be directed upwardly from the rear end portion of the floor portion 14.

Figure 2:
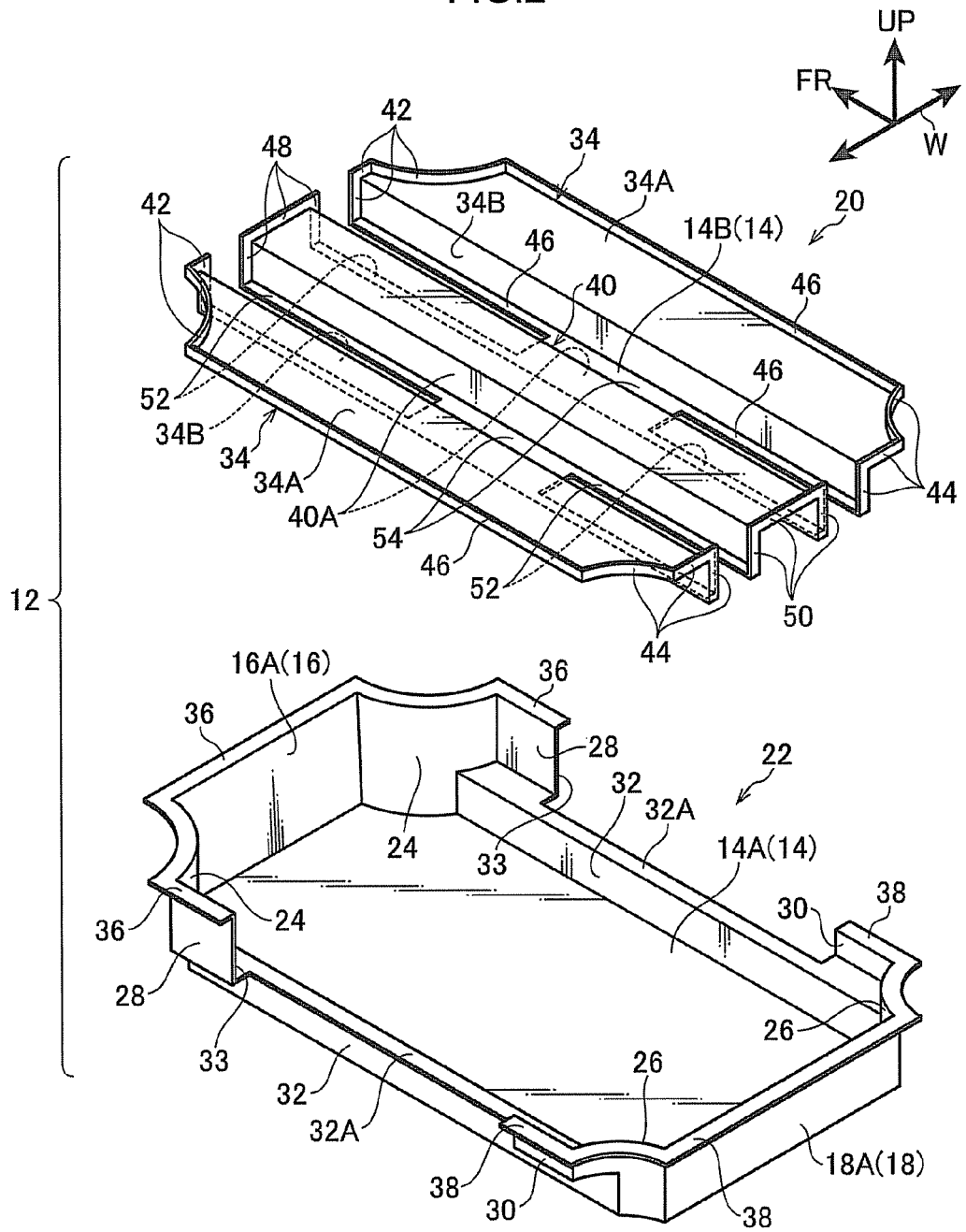
FIG. 2 is an exploded perspective view showing the resin floor structure relating to the present embodiment.
Figure 3:
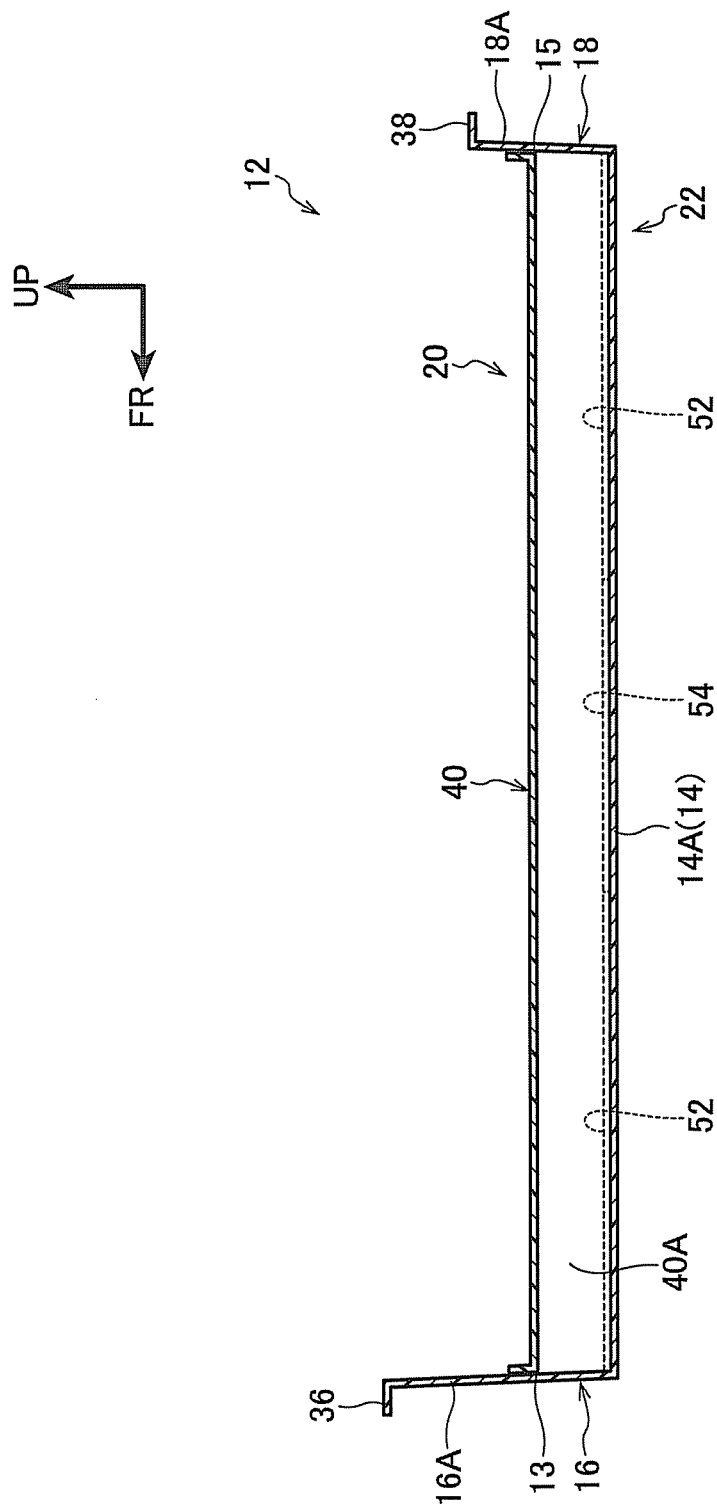
FIG. 3 is a cross-sectional view that is cut along line 3-3 of FIG. 1.

An exploded perspective view of the resin floor 12 is shown in FIG. 2. As shown in FIG. 2, the resin floor 12 is structured by an upper floor 20 and a lower floor 22 being superposed together vertically and joined together. This upper floor 20 and lower floor 22 are formed of a fiber-reinforced resin material. Examples of the fiber-reinforced resin material are fiber-reinforced plastics that contain reinforcing fibers such as, for example, carbon fibers, glass fibers, aramid fibers, or the like.

The lower floor 22 has a floor lower portion 14A that is plate-shaped and is formed in a substantially rectangular shape as seen in plan view and structures a portion of the floor portion 14 of the resin floor 12. A dash panel 16A, that serves as a vertical wall and structures the dash portion 16, is provided erect toward the vehicle upper side from the front end portion of this floor lower portion 14A. Further, a back panel 18A, that serves as a vertical wall and structures the back portion 18, is provided erect toward the vehicle upper side from the rear end portion of the floor lower portion 14A.

The dash panel 16A and the back panel 18A have lengths that span over substantially the entire region of the floor lower portion 14A in the vehicle transverse direction. Further, recessed portions 24, 26, that are circular arc shaped and that are recessed in toward the central portion side of the floor lower portion 14A, are respectively provided in the both end sides of the dash panel 16A and the back panel 18A in the vehicle transverse direction in order to prevent interference with tires (not illustrated).

Front side walls 28 respectively extend out toward the vehicle rear from the both end portions of the dash panel 16A in the vehicle transverse direction. A flange 36 juts-out substantially horizontally toward the outer sides of the lower floor 22 from the upper end portions of these front side walls 28 and the dash panel 16A. On the other hand, rear side walls 30 respectively extend out toward the vehicle front from the both end portions of the back panel 18A in the vehicle transverse direction. A flange 38 juts-out substantially horizontally toward the outer sides of the lower floor 22 from the upper end portions of these rear side walls 30 and the back panel 18A.

The lower portions of the front side walls 28 and the lower portions of the rear side walls 30 are bridged by lower walls 32 whose cross-sectional shapes are formed in substantially reverse L-shapes. Further, cut-out portions 33 are formed in the side walls of the lower floor 22 by the lower walls 32, the front side walls 28 and the rear side walls 30. Seat surfaces 32A are provided at the upper portions of the lower walls 32, and upper walls 34A of rocker portions 34 that are described later can be placed thereon (see FIG. 4).

On the other hand, the upper floor 20 has a floor upper portion 14B that is substantially rectangular in plan view and that structures a portion of the floor portion 14 of the resin floor 12. A tunnel portion 40, that serves as a frame portion (skeleton portion) and whose cross-sectional shape is formed in a substantially upside-down U-shape, is provided so as to protrude at the vehicle transverse direction central portion of this floor upper portion 14B, and is formed over substantially the entire region in the vehicle longitudinal direction.

Further, the rocker portions 34, that serve as frame portions (skeleton portions) and that are disposed substantially parallel to the tunnel portion 40 and whose cross-sectional shapes are formed in substantially reverse L-shapes, are respectively provided so as to protrude at the vehicle transverse direction both end portions of the floor portion 14, and are formed over substantially the entire region in the vehicle longitudinal direction. Further, the heights of the rocker portions 34 are set so as to be substantially the same as the height of the tunnel portion 40.

Further, a front end portion 13 (see FIG. 3) of the floor upper portion 14B of the upper floor 20 that includes the front end portions of the rocker portions 34 and the front end portion of the tunnel portion 40, is formed so as to match the shape of the inner surface of the dash panel 16A of the lower floor 22, and can contact the inner surface of this dash panel 16A.

Here, from the front end portions of the rocker portions 34 that are formed at the floor upper portion 14B, abutment portions 42 that are substantially rectangular jut-out toward the outer sides (the vehicle upper sides and the vehicle transverse direction outer sides) of the rocker portions 34 from the respective sides that structure the front end portions of the rocker portions 34 so as to surround the outer edges of these front end portions. In the state in which the abutment portions 42 planarly contact the inner surface of the dash panel 16A and the upper floor 20 is superposed on the lower floor 22, these abutment portions 42 are joined (adhered) to the dash panel 16A by an adhesive or the like. Note that, at the recessed portions 24 of the lower floor 22, the abutment portions 42 are formed in circular arc shapes along the shapes of these recessed portions 24.

Further, a rear end portion 15 (see FIG. 3) of the floor upper portion 14B is formed so as to match the shape of the inner surface of the back panel 18A, and can contact the inner surface of this back panel 18A. From the rear end portions of the rocker portions 34, abutment portions 44 that are substantially rectangular jut-out toward the outer sides (the vehicle upper sides and the vehicle transverse direction outer sides) of the rocker portions 34 from the respective sides that structure the rear end portions of the rocker portions 34 so as to surround the outer edges of these rear end portions. In the state in which the abutment portions 44 planarly contact the inner surface of the back panel 18A and the upper floor 20 is superposed on the lower floor 22, these abutment portions 44 are joined to the back panel 18A by an adhesive or the like. Note that, at the recessed portions 26 of the lower floor 22, the abutment portions 44 are formed in circular arc shapes along the shapes of these recessed portions 26.

Further, joining pieces 46, that are substantially rectangular and are formed along the vehicle longitudinal direction, jut-out toward the vehicle upper side from the side end portions of the upper walls 34A of the rocker portions 34, and can contact the inner surfaces of the front side walls 28 and the rear side walls 30. Further, in the state in which the upper floor 20 is superposed on the lower floor 22, these joining pieces 46 are joined to the front side walls 28 and the rear side walls 30 by an adhesive or the like.

Moreover, the joining pieces 46, that are substantially rectangular and are formed along the vehicle longitudinal direction, jut-out toward the vehicle transverse direction outer sides of the rocker portions 34 from the lower end portions of side walls 34B of the rocker portions 34, and can contact the floor lower portion 14A. Further, in the state in which the upper floor 20 is superposed on the lower floor 22, these joining pieces 46 are joined to the floor lower portion 14A by an adhesive or the like.

Further, from the front end portion of the tunnel portion 40 that is formed at the floor upper portion 14B, abutment portions 48 that are substantially rectangular jut-out toward the outer sides (the vehicle upper side and the vehicle transverse direction outer sides) of the tunnel portion 40 from the respective sides that structure the front end portion of the tunnel portion 40 so as to surround the outer edges of this front end portion. In the state in which the abutment portions 48 planarly contact the inner surface of the dash panel 16A and the upper floor 20 is superposed on the lower floor 22, these abutment portions 48 are joined to the dash panel 16A by an adhesive or the like.

Further, from the rear end portion of the tunnel portion 40, abutment portions 50 that are substantially rectangular jut-out toward the outer sides (the vehicle upper side and the vehicle transverse direction outer sides) of the tunnel portion 40 from the respective sides that structure the rear end portion of the tunnel portion 40 so as to surround the outer edges of this rear end portion. In the state in which the abutment portions 50 planarly contact the inner surface of the back panel 18A and the floor upper portion 14B is superposed on the floor lower portion 14A, these abutment portions 50 are joined to the back panel 18A by an adhesive or the like.

Moreover, from the lower end portions of side walls 40A of the tunnel portion 40, joining pieces 52, that are substantially rectangular and that are formed along the vehicle longitudinal direction, jut-out toward the vehicle transverse direction outer sides of the tunnel portion 40, and can contact the floor lower portion 14A. Further, in the state in which the upper floor 20 is superposed on the lower floor 22, these joining pieces 52 are joined to the floor lower portion 14A by an adhesive or the like.

Here, at the vehicle longitudinal direction central side of the tunnel portion 40 and the vehicle longitudinal direction central sides of the rocker portions 34, the lower end portions of the side walls 34B of these rocker portions 34 and the lower end portions of the side walls 40A of the tunnel portion 40 are connected by connecting portions 54 that are formed in substantially rectangular shapes. These connecting portions 54 can contact the floor lower portion 14A. In the state in which the upper floor 20 is superposed on the lower floor 22, the connecting portions 54 are joined to the floor lower portion 14A by an adhesive or the like. Further, in this state, as shown in FIG. 4, closed cross-sectional structures, that are rectangular frame-shaped as seen in a front sectional view, are respectively formed between the floor lower portion 14A, and the rocker portions 34 and the tunnel portion 40.

(Operation/Effects of Resin Floor Structure of Vehicle)

As shown in FIG. 2, the rocker portions 34 that serve as frame portions (skeleton portions) extend along the vehicle longitudinal direction at the vehicle transverse direction both end portions of the floor upper portion 14B of the upper floor 20. Further, the tunnel portion 40 that serves as a frame portion extends along the vehicle longitudinal direction at the vehicle transverse direction central portion of this floor upper portion 14B. By providing the rocker portions 34 and the tunnel portion 40 at the floor upper portion 14B in this way, the strength and rigidity of the floor portion 14 can be improved.

Further, the dash panel 16A is provided erect at the front end portion of the floor lower portion 14A of the lower floor 22, and the back panel 18A is provided erect at the rear end portion of this floor lower portion 14A. On the other hand, the abutment portions 42, 48 are provided respectively at the front end portions of the rocker portions 34 and the tunnel portion 40 of the upper floor 20, and planarly contact the inner surface of the dash panel 16A. Further, the abutment portions 44, 50 are provided respectively at the rear end portions of the rocker portions 34 and the tunnel portion 40, and planarly contact the inner surface of the back panel 18A.

In a case in which the vehicle is in a front collision for example, the impact load due to this front collision is transmitted to the dash panel 16A of the lower floor 22. Because the abutment portions 42, 48 of the rocker portions 34 and the tunnel portion 40 respectively planarly contact this dash panel 16A, the impact load that is transmitted to the dash panel 16A is transmitted to the rocker portions 34 and the tunnel portion 40 via the abutment portions 42, 48. Namely, in accordance with the present embodiment, the impact load can be received at the entire floor portion 14. Note that, also in a case in which the vehicle is in a rear collision, effects that are the same as those described above can be obtained.

Further, by providing the abutment portions 42, 48 at the front end portions of the rocker portions 34 and the tunnel portion 40, the rocker portions 34 and the tunnel portion 40 can be joined to the dash panel 16A via an adhesive for example. In this case, the surface area of joining with the dash panel 16A can be increased by an amount corresponding to the surface area over which the abutment portions 42, 48 are formed, as compared with a case in which the front end surfaces of the rocker portions 34 and the tunnel portion 40 are joined to the dash panel 16A. Therefore, the joining strength of the rocker portions 34 and the tunnel portion 40, and the dash panel 16A, can be improved. Note that effects that are the same as those described above can be obtained also for the abutment portions 44, 50 that are provided at the rear end portions of the rocker portions 34 and the tunnel portion 40.

Further, deformation of the abutment portions 42, 48 can be suppressed by providing the abutment portions 42, 48 so as to surround the outer edges of the front end portions of the rocker portions 34 and the tunnel portion 40. Due thereto, impact load can be transmitted reliably to the rocker portions 34 and the tunnel portion 40. Further, at the rocker portions 34, due to the front end portions of the rocker portions 34 and the lower end portions of the side walls 34B being surrounded by the abutment portions 42 and the joining pieces 46, deformation of the rocker portions 34 can be suppressed. In the same way as the rocker portions 34, at the tunnel portion 40 as well, deformation of the tunnel portion 40 can be suppressed due to the front end portion of the tunnel portion 40 and the lower end portions of the side walls 40A being surrounded by the abutment portions 48 and the joining pieces 52. Note that effects that are the same as those described above can be obtained also for the abutment portions 44, 50 that are provided at the rear end portions of the rocker portions 34 and the tunnel portion 40.

On the other hand, at the vehicle longitudinal direction central side of the tunnel portion 40 and the vehicle longitudinal direction central sides of the rocker portions 34, the lower end portions of the side walls 34B of the rocker portions 34 and the lower end portions of the side walls 40A of the tunnel portion 40 are connected by the connecting portions 54. Namely, the tunnel portion 40 and the rocker portions 34 are made to be integral. Accordingly, the upper floor 20, at which the rocker portions 34 and the tunnel portion 40 are provided, can be formed by integral molding, and the number of parts can be reduced.

Further, by making these connecting portions 54 be joined to the floor lower portion 14A, closed cross-sectional structures, that are rectangular frame shaped as seen in a front sectional view, are respectively formed between the floor lower portion 14A, and the rocker portions 34 and the tunnel portion 40. Due thereto, the strength and the rigidity of the floor portion 14 can be improved.

(Supplemental Description of Present Embodiment)

In the present embodiment, the front end portions of the tunnel portion 40 and the rocker portions 34 shown in FIG. 1 are made to contact the dash panel 16A, and the rear end portions of the tunnel portion 40 and the rocker portions 34 are made to contact the back panel 18A. However, it suffices to be able to receive the impact load at the entire floor portion 14, and therefore, the present invention is not limited to this. For example, there may be either one of the front end portions of the rocker portions 34 and the tunnel portion 40 being made to contact the dash panel 16A or the rear end portions of the rocker portions 34 and the tunnel portion 40 being made to contact the back panel 18A. Further, there may be a structure in which at least the front end portions of the rocker portions 34 and the tunnel portion 40 are made to contact the dash panel 16A.

Further, in the present embodiment, the abutment portions 42, 48, 44, 50 are provided respectively at the front end portions and the rear end portions of the rocker portions 34 and the tunnel portions 40, and these abutment portions 42, 48, 44, 50 abut the dash panel 16A and the back panel 18A, respectively. However, the abutment portions 42, 48, 44, 50 do not necessarily have to be these shapes. For example, the shapes of the abutment portions may be varied at the front end portions and the rear end portions of the rocker portions 34. Further, for example, the abutment portions 42 may be shapes that jut-out only toward the vehicle upper side.

Moreover, these abutment portions 42, 48, 44, 50 are not absolutely necessary, and the front end surfaces and the rear end surfaces of the rocker portions 34 and the tunnel portion 40 may be joined directly to the dash panel 16A or the back panel 18A. Note that the joining of the rocker portions 34 and the tunnel portion 40 with the dash panel 16A and the back panel 18A is not limited to a method of joining by an adhesive. For example, the joining may be joining by heat welding or bolts.

Description has been given above by using an embodiment as a form for implementing the present invention. However, the present invention is not limited in any way to this embodiment, and various modifications and substitutions can be made to the above-described embodiment within a scope that does not deviate from the gist of the present invention.

The invention claimed is:

1. A resin floor structure of a vehicle, comprising:
   a lower floor made of resin and structuring a lower portion of a floor portion;
   an upper floor made of resin and superposed on the lower floor, the upper floor structuring an upper portion of the floor portion as a separated portion from the lower floor, and the upper floor including frame portions; and
   vertical walls provided at both end portions of the lower floor in the vehicle longitudinal direction, the vertical walls being provided erect toward a vehicle upper side, front end portions or rear end portions of the frame portions in the vehicle longitudinal direction, or front and rear end portions of the frame portions in the vehicle longitudinal direction respectively abutting the vertical walls, wherein
   the frame portions are made to be rocker portions provided so as to project at both end portions of the upper floor in the vehicle transverse direction, and a tunnel portion provided so as to project at a central portion of the upper floor in the vehicle transverse direction, and
   the rocker portions and the tunnel portion form closed cross-sections between the lower floor.

2. The resin floor structure of a vehicle of claim 1, wherein abutment portions that planarly contact the vertical walls are provided respectively at the front end portions or the rear end portions of the frame portions in the vehicle longitudinal direction, or at the front and rear end portions of the frame portions in the vehicle longitudinal direction.

3. The resin floor structure of a vehicle of claim 1, wherein connecting portions that connect the rocker portions and the tunnel portion are provided at the upper floor.

* * * * *